July 12, 1938.  L. Q. PRESBY  2,123,488
APPARATUS FOR MAKING SHOE TRIMMINGS AND THE LIKE
Filed Dec. 20, 1934  4 Sheets-Sheet 4
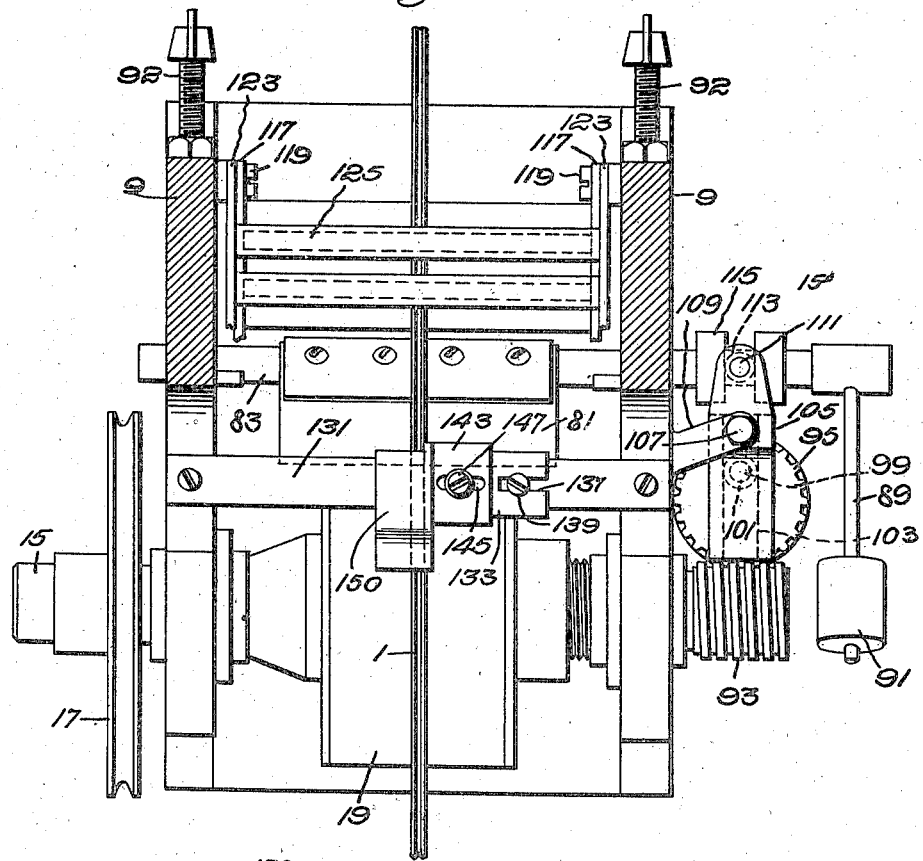
Fig. 4.
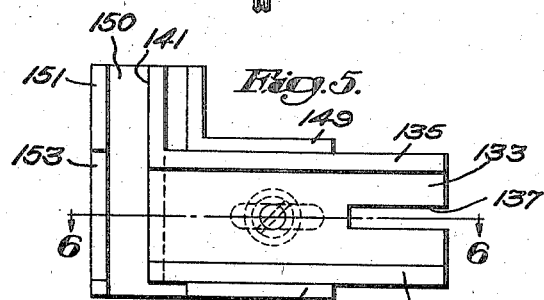
Fig. 5.
Fig. 6.
Inventor:
Leroy Q. Presby,
by Emery Booth Jamey & Townsend
Attys Patented July 12, 1938

2,123,488

UNITED STATES PATENT OFFICE 2,123,488

APPARATUS FOR MAKING SHOE TRIMMINGS AND THE LIKE

Leroy Q. Presby, Melrose, Mass., assignor to American Stay Company, East Boston, Mass., a corporation of Massachusetts Application December 20, 1934, Serial No. 758,473

13 Claims. (Cl. 101—157)

My invention relates to apparatus for use in producing ornamented trimmings, bindings, pipings, and the like for shoes and other articles, and particularly but not exclusively for use in producing the trimmings disclosed in co-pending application of Albert C. Murray Serial No. 643,037, filed November 17, 1932 (now Patent 1,990,461, issued February 5, 1935).

The invention will be best understood from the following description when read in the light of the accompanying drawings of a machine constituting one embodiment of the invention, while the scope of the latter will be more particularly pointed out in the appended claims.

In the drawings:—

Figure 1:
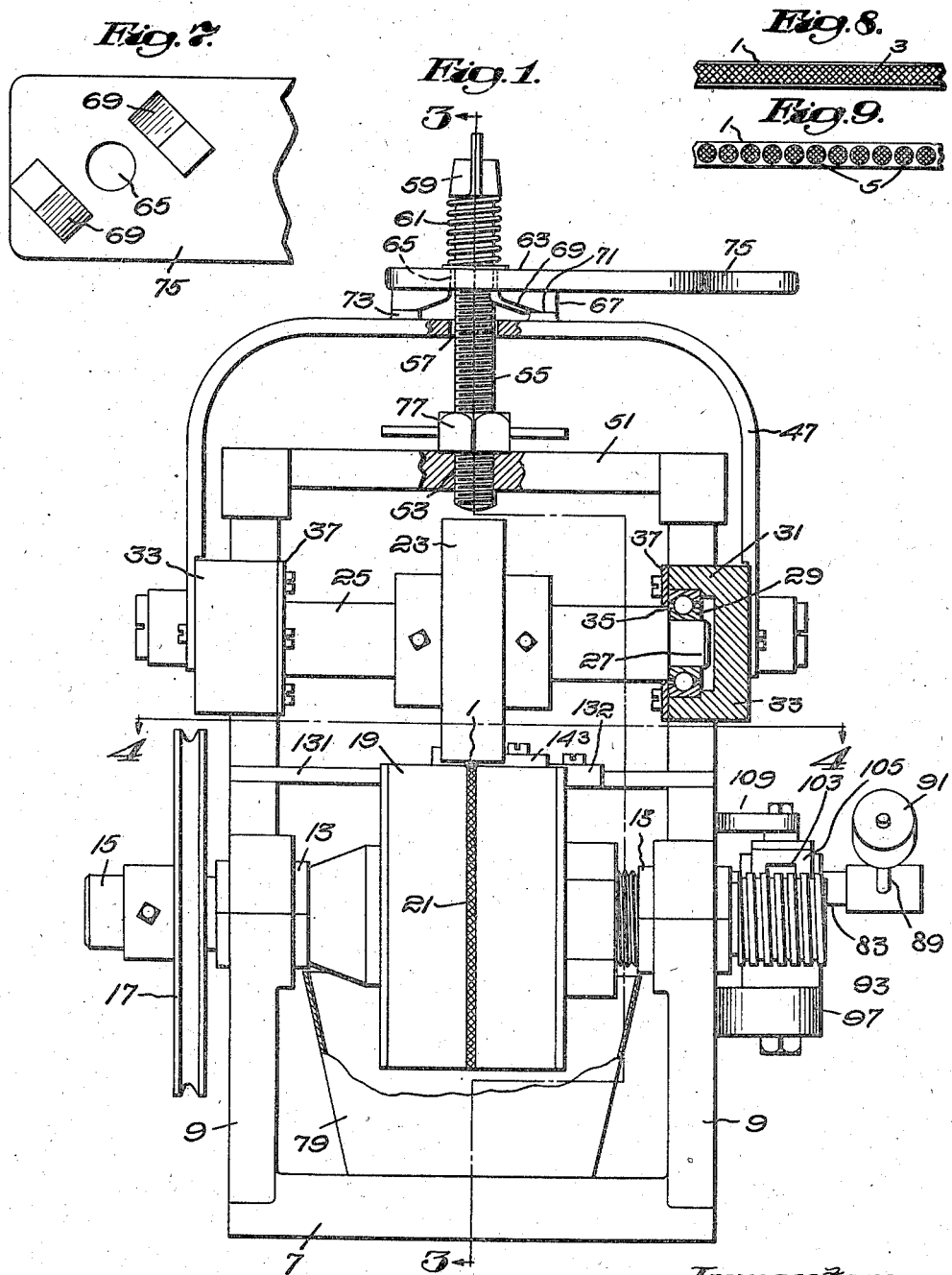
Fig. 1 is a front elevation of a machine constructed according to the invention with parts broken away.
Figure 3:
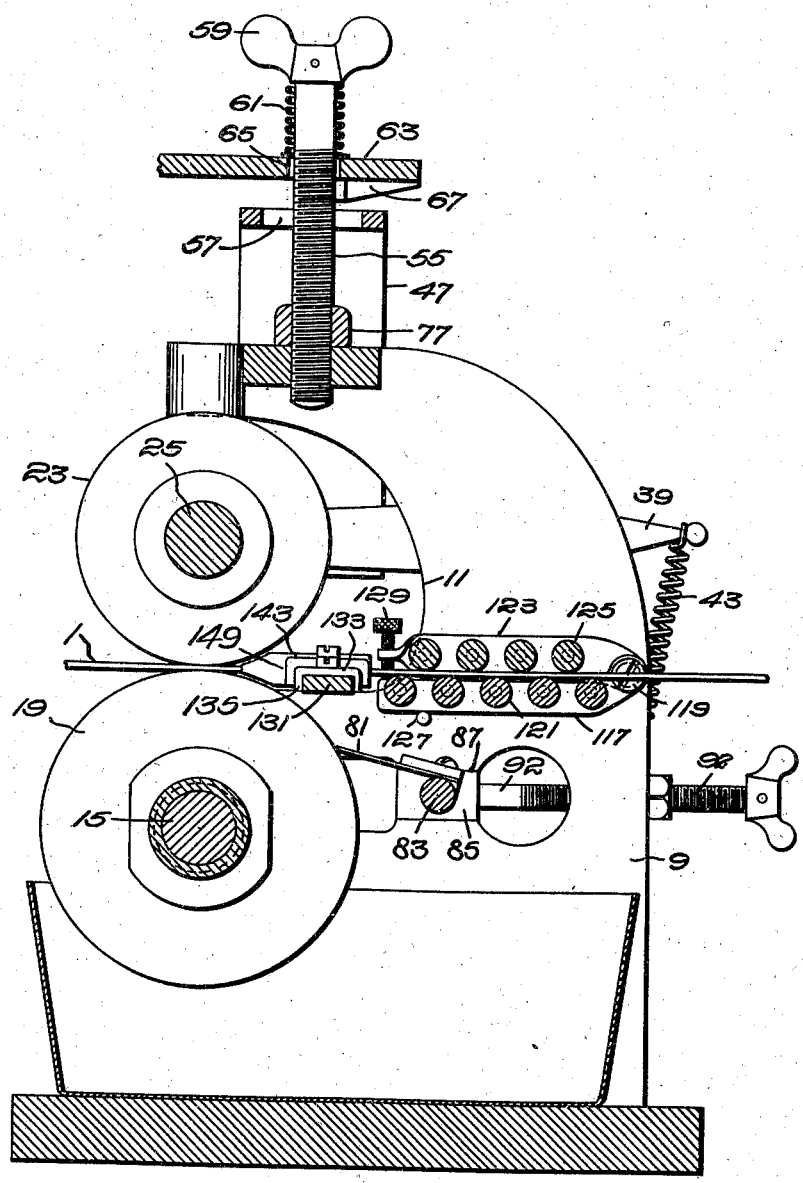

Figs. 3 and 4 are respectively sections on the lines 3—3 and 4—4 of Fig. 1;

Fig. 5 is a bottom view of the guide shown in Fig. 4 on an enlarged scale;

Fig. 6 is a section on the line 6—6 of Fig. 5;

Fig. 7 is a bottom view of the spring release mechanism shown in Fig. 1; and

Figs. 8 and 9 show two examples of ornamented trimmings.

Heretofore ornamented trimmings for shoes commonly have been made by cementing to the body of a narrow leather strip a superimposed narrower strip of leather of contrasting color, which narrower strip is sometimes cut to form a desired design. Such trimmings, however, besides being expensive to fabricate, are, because of their relatively great thickness, difficult to bend transversely about corners in applying them to the shoe, and are lacking in durability because of the tendency of the strip of ornamentation to separate from the body of the strip, particularly when the trimming is bent around a corner and as a consequence slightly wrinkles or buckles.

The attempt to ornament shoe trimmings by the use of ink or color, or by the use of granular, powdered, or flocculent materials, has heretofore proved unsuccessful because, among other things, of failure uniformly to cover the leather or other material with ink or color, or apply the design with proper or uniform relation to the edges of the strip, or secure a sharp line of demarcation between the color or other material and the body of the strip.

According to the present invention the strip 1 constituting the body of the trimming has formed thereon a design which may consist of a continuous or interrupted thin layer of flaccid material more particularly described in the co-pending application above referred to. The design in which this ornamentation is formed may take a multitude of forms, among which is a simple continuous band 3, shown in Fig. 8, or an interrupted band consisting of dots 5, shown in Fig. 9. It has been found in the vast majority of cases that best effects are secured when the edges of the ornamentation are slightly spaced from the edges of the strip, as indicated in Figs. 8 and 9. This, because the strip commonly will be relatively narrow, say about $\frac{3}{16}$" wide, will necessitate placing of the ornamentation with considerable accuracy and uniformity with relation to the edges of the strip, as otherwise the attempt to ornament the strip would result in an unsightly product.

Figure 2:
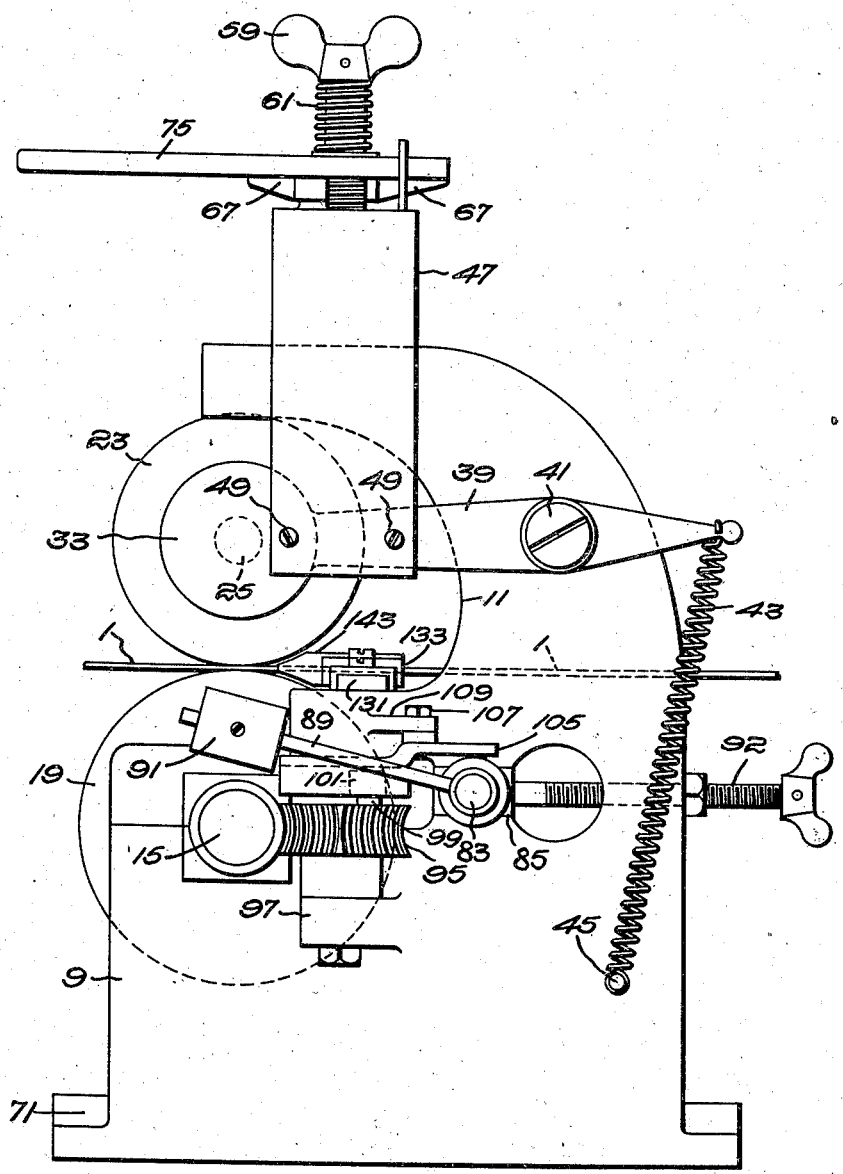
Fig. 2 is a side elevation of the machine according to Fig. 1.

Referring to the drawings of the submitted embodiment of the invention, a frame is provided comprising a base 7 at opposite sides of which are vertical standards 9, the latter being roughly C-shaped, as shown in Figs. 2 and 3, so as to provide openings 11 for a purpose which will hereinafter appear. Carried by the standards 9 are bearings 13 for a shaft 15 driven by a suitable belt pulley 17, this shaft carrying between the standards a roll 19 for applying the layer of ornamentation to the strip 1. Conveniently this roll may consist of a copper cylinder which, as illustrated, is provided with a circumferential band 21 preferably formed by knurling, or, if desired, by a photogravure process, to cause the band to consist of a multitude of closely spaced minute depressions. The particular band 21 shown is that used for printing the continuous ornamental band shown in Fig. 8, and it will be understood of course that if the ornamentation to be formed is in the nature of an interrupted band, the band 21 will be likewise interrupted as, for example, may be formed corresponding to the ornamentation shown in Fig. 9.

Cooperating with the roll 9 is a presser member, which herein takes the form of a roll 23 adapted to contact with the upper side of the strip 1 being operated upon. As shown, the roll 23 is mounted on a shaft 25 having reduced diameter end portions 27, each of which latter carries the inner race 29 of a ball bearing, the outer race 31 of which is received in a suitable recess formed in the block 33. As shown, the shoulder 35 formed by the reduced diameter portion 27 of the shaft abuts with the inner race 29 so that the ball bearing serves also as a thrust bearing for preventing longitudinal movement of the shaft 25. Conveniently each ball bearing is held in place by a plate 37 secured to the inner side of the block 33.

As shown, the blocks 33 are carried at the ends of levers 39 positioned at the outer sides of the standards 9, said levers being pivoted to the latter at 41. As shown, the free end of each lever 39 has attached thereto one end of a tension spring 43, the other end of which is attached to the frame at 45 so as normally to urge the roll 23 away from the roll 19. Herein the blocks 33 are rigidly connected by a yoke member 47 which extends over the top of the standards 9, the opposite arms of the yoke being operatively secured to the levers by suitable screws 49. As shown, extending between the standards 9 and rigidly carried thereby is a bar 51, the latter having a screw threaded perforation 53 into which is screw threaded an upwardly projecting bolt 55, the latter extending freely through an opening 57 at the upper portion of the yoke 47. At its upper end the bolt 55 fixedly carries a head 59 serving as the upper abutment for a rather stout compression spring 61 having but a slight degree of expansion, the lower abutment for which spring is formed by a lever 63 having an opening 65 through which the bolt 55 freely extends. At its under side the lever 63 carries a pair of cam or wedge members 67 having the inclined faces 69 and "flat" faces 71, these members 67 cooperating with bosses 73 on the upper side of the yoke 47.

In the position of parts shown in Fig. 1 of the drawings the spring 61, reacting between the abutments afforded by the head 59 and lever 63, presses the yoke 47 downwardly, which causes the upper roll 23 to be urged toward the lower roll 19 with a force greater than that with which the springs 43 urge the upper roll 23 away from the roll 19.

As illustrated, the lever 63 is elongated so that one end 75 thereof affords a convenient handle grip by which the operator is enabled to rotate the lever from the position of parts shown in Fig. 1 to such position that the cams 67 are no longer in contact with the bosses 73, under which condition the spring 61 expands to beyond its limit of expansion by movement of the lever 63 downwardly relative to the yoke 47, and therefore no longer acts to urge the upper roll 23 downwardly, the latter consequently under these conditions being moved upwardly by the springs 43 so as to relieve the pressure on the strip 1. For varying the force with which the spring 61 urges the roll 23 toward the roll 19, the bolt 55 may be rotated so as readily to adjust it vertically relative to the bar 51 when the cam lugs 67 are out of contact with the lugs 73, a lock nut 77 being provided for holding the bolt in its adjusted positions. This adjustment, which moves the head 59 constituting the upper spring abutment vertically up or down as desired, causes, when the lever 63 is moved into the position of parts shown in Fig. 1, the spring 61 to exert an adjusted force on the lever 63 and consequently on the roll 23.

Herein the lower roll 21 dips into a container 79 containing coating material to be applied to the strip 1. For wiping the roll 19 clean of all coating material, except that which is in the minute depressions of the band 21, a suitable doctor may be employed, the latter as illustrated being in the form of a flexible doctor knife 81 carried by a shaft 83 which is rotatably and reciprocally mounted in bearings 85, these bearings being mounted for horizontal sliding movement in slots 87 in the vertical standards 9. As shown, the shaft at one end thereof has a radially extending arm 89 carrying a weight 91 which urges the shaft to rotate in the bearings 85 in such direction as to press the doctor knife against the roll 19, or by rotating the arm 89 in an upwardly direction the doctor knife may be permanently held out of contact with the roll. When the parts are in the position shown in Figs. 1 and 3, the bearings 85 tend to slide to the right, as viewed in Fig. 3, against the ends of bolts 92 screw threaded into the standards 9. By turning the bolts 92 the bearings 85 may be adjusted toward the roll 19.

Herein, for reciprocating the shaft 83 which carries the doctor knife 81, the shaft 15 for the lower roll 19 carries, at its end opposite the pulley 17, a worm 93 which drives a worm wheel 95, the latter being rotatably mounted on a spindle (not shown) carried by a bracket 97 (Figs. 1 and 2) extending from the adjacent standard 9 of the frame. As shown, the worm wheel 95 has an upwardly extending pin 99 carrying a roller 101 which fits into a slot 103 formed on the under side of a lever 105, which lever is pivotally supported at 107 on the bracket 109 fixedly carried by the adjacent standard 9. As a result of this construction, when the machine is in operation, the lever 105 is oscillated in a horizontal plane about its pivot 107. At one end thereof the lever 105 carries a downwardly projecting pin 111 on which at the under side of the lever is supported a roller 113 positioned between collars 115 on the shaft 81 so that when the lever is oscillated the shaft 81 will be reciprocated. As shown, the roller 113 is positioned directly above the shaft 81, which arrangement permits the shaft to be adjusted toward the roll 19 by means of the adjusting screws 92 and permits the shaft to be rotated in its bearings by the counter-weight 91 without interference.

Suitable tensioning means are preferably employed for the strip 1, said means herein comprising a pair of spaced lower arms 117, each of which at one end thereof is pivotally supported by a pin 119 carried at the inner side of the adjacent standard 9 (see Figs. 3 and 4). The spaced arms 117 herein carry spaced rollers 121 over which the strip 1 passes. Likewise pivoted to the pins 119 are upper arms 123 which carry spaced rollers 125 in staggered relation to the other rollers 121, so that the weight of the upper rollers and arms 123 contacting with the lower rollers serves to tension the strip. Normally the arms 117 rest on pins 127 projecting from the adjacent standards, while one or the other of the upper arms 123 carries a set screw 129 the end of which is adapted to contact with one of the arms 117 so that the tension on the strip may be regulated. When initially threading the strip through the machine, the upper arms 123 with their associated rollers may be readily raised by swinging the arms about the pivot pins 119, and, if desired, both sets of arms and rollers may be moved out of operative position with relation to the strip by swinging them about the pivot pins 119, allowing the arms to hang downwardly in a vertical position.

For guiding the strip in operative relation with the band 21 on the roll 19, the machine herein illustrated is provided with a guide carried by a bar 131, which latter, as shown, is of rectangular cross-section and is carried at opposite ends thereof by the several standards 9. As shown, resting on this bar, and adapted to be secured thereto in adjusted position, is a member 133 having at its opposite edges marginal flange portions 135, which latter with the body of the member form a slot receiving the bar. The member 133 at one end is provided with a slot 137 through which passes a screw 139 tapped into the bar 131 so that the member 133 may be secured in different adjusted positions longitudinally of the bar. At the end of the member 133 opposite the slot 137 is a laterally and upwardly projecting flange 141 which serves as the guide for one edge of the strip 1. Lying on the member 133 is a member 143 having an elongated slot 145 through which passes a set screw 147 for securing the member 143 in adjusted relation to the member 133. As shown, the member 143 has the side flanges 149 which with the body of the member 133 form a slot receiving the member 133. Further, the member 143 is provided with a laterally projecting portion 150 having a downwardly projecting marginal flange 151 which is notched as shown at 153 so as to be out of contact with the bar 131. By loosening the set screw 147 and adjusting the member 143 relative to the member 133 the space between the flanges 151 and 141 can be varied to accommodate different widths of strips 1, while by adjusting the entire guide member relative to the bar 131 upon loosening the set screw 139, the guide may be adjusted relative to the band 21 on the roll 19.

In operation, the roll 19 is coated with the coating material in the container 79, all of this material which adheres to the roll being wiped therefrom by the doctor knife 79 except such material as is forced by the knife into the minute depressions forming the band 21 or otherwise enters these depressions. The surface of the roll 19 forms a support for the entire width of the strip 1, while the upper roll 23 under the influence of the springs 61, when the parts are in the position shown in Fig. 1, exerts considerable pressure on the strip so as to force it into contact with the rim portions of the minute depressions in the surface of the roll 19. The strip 1 being operated upon is preferably initially coated with a pyroxylin compound or other suitable material, while the coating material applied by the machine preferably contains a solvent for the coating on the strip, with the result that the coating material drawn from the minute depressions by the squeezing and releasing action of the rolls on the strip adheres to the latter and integrally unites therewith without noticeable spreading. The strip is fed by action of the two rolls which grip it, and the feeding at any time may be interrupted by disengaging the wedge cams 67 from the lugs 73 on the yoke 47 by the operator swinging the lever 75. To insure that the ornamentation formed on the strip is in the exact center thereof, after the strip is once run through the rolls it may be reversed transversely and again run through them so as to avoid any possible effect of inaccurate alignment of the strip guide with the band 21.

It will be understood that wide deviations may be made from the form of the invention herein described without departing from the spirit of the invention.

I claim:

1. Apparatus for applying a coating to a limited portion of the surface between the edges of a narrow elongated strip having, in combination, coating applying means comprising a driven roller having a portion of the surface thereof of less width than the strip formed to present a circumferential band of minute closely spaced depressions, means for guiding the strip into operative relation to said band, a presser roller cooperating with said driven roller for operating upon the strip and pressing it for the entire width thereof into contact with said driven roller, means capable of readily being rendered inoperative under the control of the operator for yieldingly urging said presser roller toward said driven roller, and means for urging said presser roller away from said driven roller under a lesser force than it is urged toward it by the last mentioned means.

2. Apparatus for applying a coating to a limited portion of the surface between the edges of a narrow elongated strip having, in combination, coating applying means comprising a driven roller having a portion of the surface thereof of less width than the strip formed to present a circumferential band of minute closely spaced depressions, means for guiding the strip into operative relation to said band, a presser roller cooperating with said driven roller for operating upon the strip, an adjustable spring means for yieldingly urging said presser roller toward said driven roller, operator controlled means for rendering said spring means inoperative, and means acting automatically upon rendering said spring means inoperative to move said presser roller bodily away from said driven roller.

3. Apparatus for applying a coating to a limited portion of the surface between the edges of a narrow elongated strip having, in combination, coating applying means comprising a driven roller having a portion of the surface thereof of less width than the strip formed to present a circumferential band of minute closely spaced depressions, means for guiding the strip into operative relation to said band, a presser roller cooperating with said driven roller for operating upon the strip, movable mounting means for said presser roller having means normally urging said presser roller away from said driven roller, and readily releasable means under the control of the operator cooperating with said mounting means operative resiliently to urge said presser roller toward said driven roller with greater force than it is urged away from it.

4. Apparatus of the character described having, in combination, an instrumentality for applying a coating to a strip comprising a pair of cooperating rolls, movable bearings for one of said rolls, a mounting for said bearings, means for urging said mounting in one direction for moving the roll carried thereby away from the other roll, a spring, an abutment for the latter operatively carried by said mounting, and means under the control of the operator for operatively releasing said abutment from said mounting.

5. Apparatus of the character described having, in combination, means for coating and feeding a strip comprising a pair of rolls, a support for one of said rolls, a relatively pivoted support for the other of said rolls, a spring having an abutment operatively carried by the first mentioned support, and a releasable abutment for said spring operatively carried by the second mentioned support.

6. Apparatus of the character described having, in combination, a printing roller, a presser roller cooperating therewith, means urging said presser roller away from said printing roller, spring means for urging said presser roller toward said printing roller under a greater force than it is urged away by the first mentioned means, and operator controlled means for rendering said spring means inoperative.

7. Apparatus of the character described having, in combination, a printing roller, a presser roller cooperating therewith, a movable mounting for said presser roller, means acting on said mounting to urge said presser roller away from said printing roller, spring means acting on said mounting for urging said presser roller toward said printing roller under a greater force than it is urged away by the first mentioned means, and an operator controlled releasable abutment for said spring means.

8. Apparatus of the character described having, in combination, a printing roller, a presser roller cooperating therewith, a movable mounting for said presser roller, means acting on said mounting to urge said presser roller away from said printing roller, spring means acting on said mounting for urging said presser roller toward said printing roller under a greater force than it is urged away by the first mentioned means, and an operator controlled releasable abutment for said spring means operatively carried by said mounting.

9. Apparatus of the character described having, in combination, a printing roller, a presser roller cooperating therewith, a movable mounting for said presser roller, means acting on said mounting for urging said presser roller away from said printing roller, a spring acting on said mounting for urging said presser roller toward said printing roller under a greater force than it is urged away by the first mentioned means, a pair of abutments for said spring one of which is adjustable for varying the tension of said spring and the other of which is releasable under the control of the operator for rendering said spring inoperative.

10. Apparatus of the character described having, in combination, a printing roller, a presser roller cooperating therewith, a movable mounting for said presser roller, means acting on said mounting for urging said presser roller away from said printing roller, a spring acting on said mounting for urging said presser roller toward said printing roller under a greater force than it is urged away by the first mentioned means, a pair of abutments for said spring one of which is adjustable for varying the tension of said spring and the other of which is operatively carried by said mounting and is releasable under the control of the operator for rendering said spring inoperative.

11. Apparatus of the character described having, in combination, a printing roller, a presser roller cooperating therewith, means urging said presser roller away from said printing roller, spring means for urging said presser roller toward said printing roller under a greater force than it is urged away by the first mentioned means, and operator controlled means for adjusting the force exerted by said spring means and for rendering said spring means inoperative.

12. Apparatus of the character described having, in combination, a printing roller, a presser roller cooperating therewith, means urging said presser roller away from said printing roller, spring means for urging said presser roller toward said printing roller under a greater force than it is urged away by the first mentioned means, operator controlled means for adjusting the force exerted by said spring means, and separate operator controlled means for rendering said spring means inoperative.

13. Apparatus of the character described having, in combination, a printing roller, a presser roller cooperating therewith, means urging said presser roller away from said printing roller, spring means for urging said presser roller toward said printing roller under a greater force than it is urged away by the first mentioned means, operator controlled means for adjusting the force exerted by said spring means, and separate operator controlled means for rendering said spring means inoperative, the last mentioned means comprising a releasable abutment for said spring means.

LEROY Q. PRESBY.